Nov. 27, 1923.  
D. F. LEPLEY  
1,475,637  
WEIGHING AND LOADING APPARATUS FOR HOIST SKIPS  
Filed Aug. 31, 1922   2 Sheets-Sheet 1

Inventor  
D. F. Lepley  
By C.A.Snow&Co.  
Attorneys.

Nov. 27, 1923.
1,475,637
D. F. LEPLEY
WEIGHING AND LOADING APPARATUS FOR HOIST SKIPS
Filed Aug. 31, 1922    2 Sheets-Sheet 2

D. F. Lepley
Inventor

By C. A. Snow & Co
Attorneys

Patented Nov. 27, 1923.

1,475,637

UNITED STATES PATENT OFFICE.

DANIEL F. LEPLEY, OF CONNELLSVILLE, PENNSYLVANIA.

WEIGHING AND LOADING APPARATUS FOR HOIST SKIPS.

Application filed August 31, 1922. Serial No. 585,542.

*To all whom it may concern:*

Be it known that I, DANIEL F. LEPLEY, a citizen of the United States, residing at Connellsville, in the county of Fayette and State of Pennsylvania, have invented a new and useful Weighing and Loading Apparatus for Hoist Skips, of which the following is a specification.

This invention relates to apparatus for weighing coal and for directing it to hoist skips.

It has been the practice heretofore to dump mine cars so that the load will be delivered into a weigh-pan but the structures heretofore employed have been objectionable because their operation has depended almost entirely upon proper counterbalancing. The weight of the coal has been utilized to lower the pan and to overcome the counterweight employed to bring the pan back to loading position after being emptied. It often happens, however, that a partially loaded car is discharged into the pan and there is not sufficient weight in the pan to overcome the counterbalance and lower the pan to the point of delivery.

It has been the practice generally to provide these weigh pans with brakes which serve to hold the pans against downward movement. When a brake is released the weight of the coal in the pan will overcome the counterweights and cause the pan to move downwardly. When the pan reaches a predetermined point in its descent the brake is applied to hold the pan against further movement until its contents are discharged. The brake is then released and the counterweights will bring the pan back to its upper or loading position. The manipulation of this brake requires a very skilled operator in order to avoid excessive speed and hammering of the weights and pan.

One of the objects of the present invention is to overcome all of the objectionable features present in weighing apparatus that have heretofore utilized gravity means for opening and closing the discharging means. This is effected in the present instance by employing power operated means for shifting the movable portions of the pan, said means including a structure whereby the pan will retain its load until application of power for the purpose of delivering material from the pan.

A further object is to provide cushioning means whereby the actuation of the parts by power can be properly controlled.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings there has been shown one adaptation of the invention, although it is to be understood that other arrangements can obviously be used.

In said drawings

Referring to the figures by characters of reference 1 designates the platform of scales, the mechanism of the scales, in the present instance, not being illustrated and the platform portion 1 being suitably supported within the chamber A where the rotary dump B is located. This rotary dump has been illustrated in diagram only, the engine employed for revolving it being indicated generally at C and the supporting structure on which the dump and its engine are mounted being indicated at D. The rotary dump is located below the platform 1 of the scales.

Figure 1:
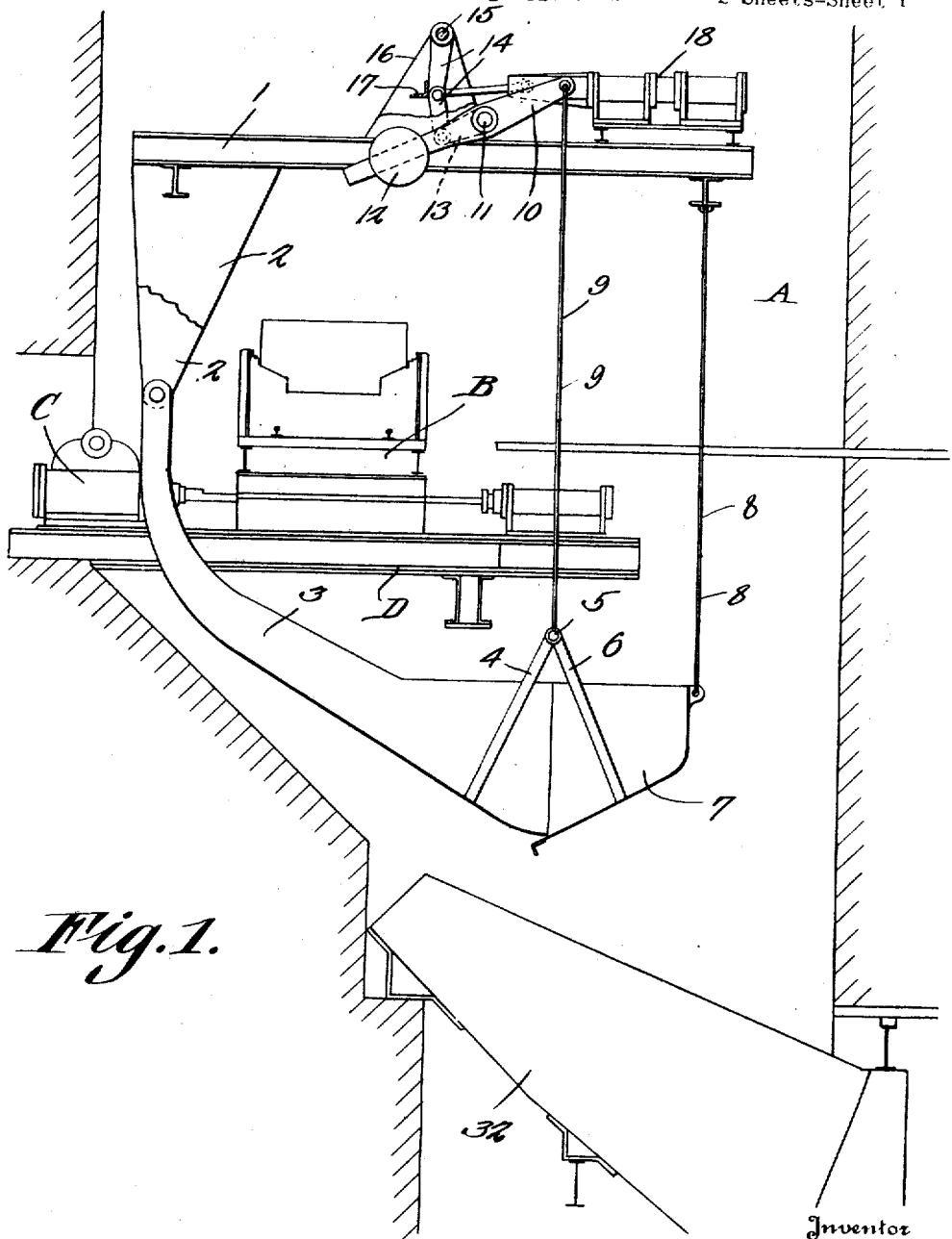
Figure 1 is a view partly in elevation and partly in section showing the relative positions of the parts while the weigh pan is in loading or receiving position, the figures being more or less in diagram, and showing a type of pan formed of bodily movable sections.

Hangers 2 extend downwardly from the platform 1 and pivotally connected to the lower ends thereof is the upper end of a downwardly and laterally extending chute 3 forming one section of the weigh pan. This chute has hangers 4 secured to the sides thereof near the lower or free end of the chute and said hangers are pivotally connected at their upper ends, as at 5, to hangers 6 fixedly secured to a bucket 7 forming another member of the weigh pan. Bucket 7 is suspended at its outer or closed end by rods or cables 8 depending from the scales platform 1 and the hangers 4 and 6 are supported by rods or cables 9 attached to arms 10. These arms are secured between their ends to a transverse shaft 11 supported on the platform 1 and those ends of the arms remote from the supporting means 9 are provided with counterweights 12. A crank arm 13 is extended from the shaft 11 and is connected by toggle links 14 to a shaft 15 supported in suitable bearings 16 on platform 1. A stop 17 is adapted to be engaged by the toggle when the intermediate joint thereof is past the dead center, at which time the crank arm 13 will be held in its lowermost position and the arms 10 will be secured as shown in Figure 1 so as to support the pan with the open ends of the chute 3 and bucket 7 together as shown in said figure.

For the purpose of shifting the toggle 14 an engine indicated generally at 18 is mounted on the platform 1. This engine is preferably formed with a power cylinder 19 and a cushioning cylinder 20. The power cylinder has an inlet port 21 at each end, a pressure supply pipe 22 and an exhaust port 23. A valve 24 is provided and is so constructed that when brought to one position one of the ports 21 will be placed in communication with the supply pipe 22 while the other port 21 will be placed in communication with the exhaust port 23. When the valve is brought to its other position, however, the flow of pressure will be reversed. Valve 24 can be operated by any suitable means, such as a lever 25.

The cushioning cylinder 20 has a bypass 26 extending from one end to the other thereof and provided with a valve 27 whereby the flow of fluid through the bypass can be controlled. This valve is to be operated by means of a lever 28 or any other suitable means provided for that purpose.

A rod 29 is attached to the middle joint of the toggle 14 and is mounted for reciprocation within the two cylinders 19 and 20. A piston 30 is secured to this rod and adapted to reciprocate in cylinder 19 while another piston 31 is secured to the rod and adapted to work within the cylinder 20. Cylinder 20 is to be filled with oil or other cushioning fluid and will obviously check the movement of the pistons, the speed of movement being controlled by the valve 27.

A chute 32 is arranged under the weigh pan so as to receive material delivered therefrom, this chute serving to direct the delivered material into the hoist skip or other receptacle provided.

Figure 2:
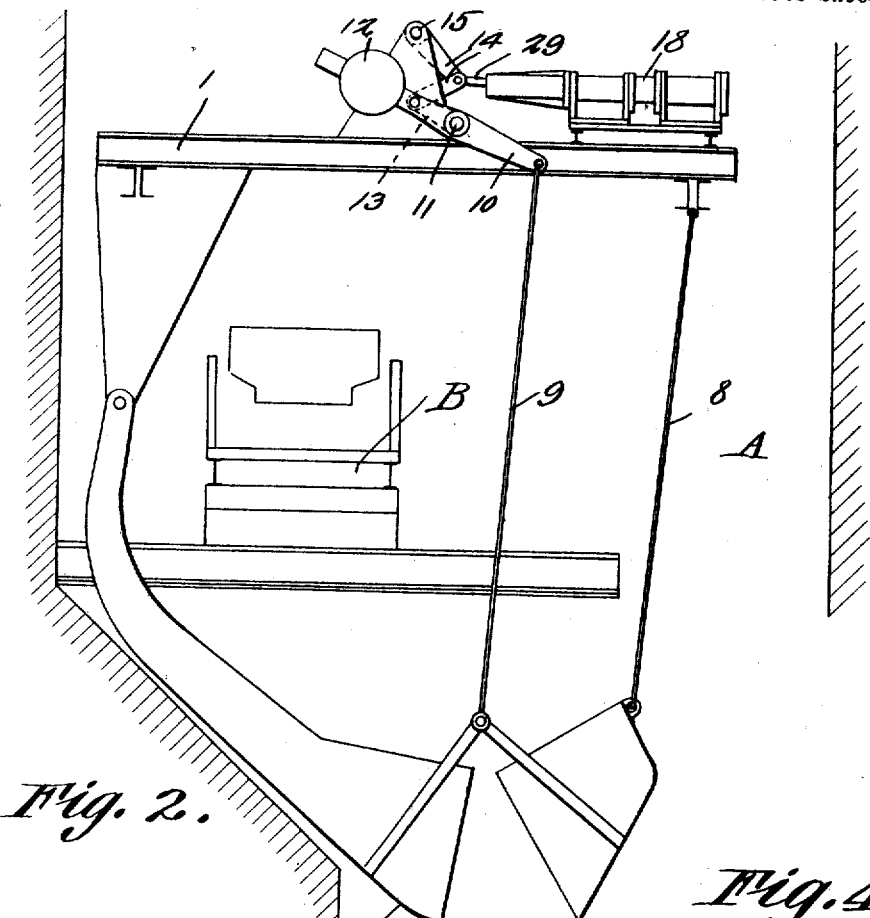
Figure 2 is a view similar to Figure 1, showing the relative positions of the parts during the delivery of the load from the pan.
Figure 4:
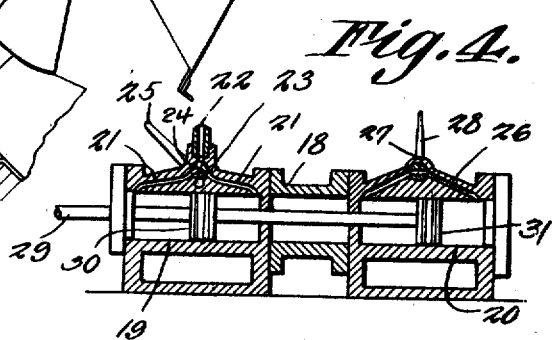
Figure 4 is a section through one form of engine that can be used for operating the mechanism.
Figure 3:
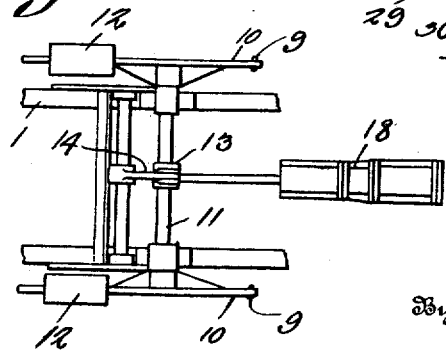
Figure 3 is a plan view of the controlling mechanism.

Under normal conditions the weigh pan is supported in raised position as shown in Figure 1, the pressure of fluid against piston 24 serving to hold the arms 10 inclined as shown in said figure so as properly to support the meeting portions of the two parts of the weigh pan. As the intermediate joint of the toggle 14 is off center and bearing against the stop 17 the weigh pan will be supported properly even though the pressure should fail. When a car is directed into the rotary dump B said dump is actuated in the usual or any preferred manner so that the contents of the car will be directed into the upper inclined portion of the chute 3 and thence to the lower portion of the weigh pan made up of the parts 3 and 7. As the weigh pan is held securely against movement there will be no pounding or vibration of the parts during this operation. The weight of the coal or other material delivered to the pan will be applied to the platform 1 and the scales of which the platform is a part, will indicate the weight of the material in the pan. As soon as the weighing operation has been completed the operator shifts valve 24 so as to direct pressure against that face of the piston 30 nearest toggle 14. Thus rod 29 will be shifted to pull on the toggle and will lift arm 13 and rotate shaft 11. Arms 10 will therefore swing so as to lift the counterweights 12 and lower the hangers 4 and 6. This will cause the hangers to swing apart and the members 3 and 7 of the weigh pan to correspondingly move away from each other as shown in Figure 2. The material in the pan will thus be dilivered to the chute 32. The power can then be reversed in the engine so as to return the parts to their initial positions, this return being assisted by the weights 12.

Obviously by the use of power the movable portions of the pan can be shifted irrespective of the weight of the contents of the pan and the proper operation of the weighing apparatus under all conditions is therefore insured. The cylinder 20 and the piston 31 cooperate to form a cushion or dash pot whereby the speed of operation can be controlled and pounding of the mechanism is avoided. By utilizing the toggle 14 and the stop 17 the movable portions of the pan are supported securely even though the pressure should fail. The speed of operation can be controlled by shifting the valve 27.

What is claimed is:—

1. The combination with the platform of weighing scales, of movably supported hingedly connected members suspended from the platform and normally closed together to form a weigh pan, counterbalanced means connected to the members of the weigh pan for holding them in normal position, and fluid cushioned pressure operated means for shifting the counterbalanced means out of normal position to release the weigh pan from its normal position.

2. The combination with the platform of weighing scales, of a weigh pan movably suspended therefrom and comprising connected members normally closed together, counterbalanced means for holding the weigh pan in normal position, means for fastening the counterbalanced means against movement under the weight of the load in the pan, and fluid cushioned pressure operated means for releasing and actuating the counterbalanced means to lower the pan out of normal position.

3. The combination with the platform of weighing scales, of movably supported hingedly connected members suspended from the platform and normally closed together to form a weigh pan, counterbalanced means connected to the members of the weigh pan for holding them in normal position, means for fastening the counterbalanced means and the weigh pan against movement under the weight of a load, and pressure operated means for releasing and actuating the counterbalanced means to release the pan from its normal position.

4. The combination with the platform of weighing scales, of opposed members movably suspended at their outer ends from the platform and hingedly connected adjacent their inner ends to each other, said members cooperating to form a weigh pan, counterbalanced means for normally supporting the connected ends of the weigh pan members, and pressure operated means for shifting the counterbalanced means to lower the connected ends of the weigh pan members out of normal position.

5. The combination with the platform of weighing scales, of opposed members movably supported at their outer ends from the platform and hingedly connected at their inner ends, said members cooperating to form a weigh pan, means for normally supporting the connected ends of the weigh pan members, and power operated means for releasing said supported connected ends for downward movement under the weight of the contents of the weigh pan.

6. The combination with the platform of weighing scales, of opposed members movably suspended at their outer ends from the platform and hingedly connected at their inner ends to form a weigh pan, counterbalanced means for supporting the weigh pan at the connected ends of the members thereof, a toggle movable with said counterbalanced means, a stop for holding the toggle past dead center to secure the counterbalanced means against movement under the weight of the load in the pan, and power operated means for shifting the toggle to release the counterbalanced means and the pan.

7. The combination with the platform of weighing scales, of opposed members movably suspended at their outer ends from the platform and hingedly connected together at their inner ends to form a weigh pan, counterbalanced means for normally supporting the members at their hingedly connected ends, a toggle movable with said counterbalanced means, means for holding the toggle past the dead center to secure the counterbalanced means against movement, and fluid cushioned pressure operated means for shifting the toggle past its dead center to release the counterbalanced means and the hingedly connected ends of the pan members.

8. The combination with a supporting structure, of opposed members movably mounted at their outer ends and suspended from said structure, said members being hingedly connected at their inner ends to form a pan, means for supporting the hingedly connected ends of the members to hold them closed together, and power operated means for actuating the supporting means to lower the hingedly connected ends of the members and deliver the contents of the pan downwardly between the members.

9. The combination with a supporting structure, of opposed members movably suspended at their outer ends from said structure and hingedly connected at their inner ends, said members cooperating to form a pan, counterbalanced means for supporting the members at their hingedly connected ends, and power operated means for overcoming the counterbalanced means to allow gravitation of the hingedly connected ends of the members and movement of said members about their respective outer end supports.

10. The combination with a supporting structure, of opposed members movably suspended at their outer ends from the structure and hingedly connected at their inner ends to form a pan, counterbalanced arms, connections between the arms and the inner ends of said members for holding the members normally closed together to retain the contents of the pan, and fluid cushioned power operated means for shifting the counterbalanced means to release those portions of the members supported thereby.

11. The combination with a supporting structure, of opposed members movably suspended at their outer ends from the structure and hingedly connected at their inner ends to form a pan, counterbalanced arms, connections between the arms and the inner ends of said members for holding the members normally closed together to retain the contents of the pan, a toggle movable with the arms, a fluid cushioned pressure operated engine for shifting the toggle to raise or lower the counterbalanced arms, and a stop for the toggle for holding said toggle with its intermediate joint past the dead center, thereby to secure the arms against movement under the weight of the pan and its load.

12. The combination in weighing scales of the class described, of a weigh pan having portions movable relatively to open or close the bottom of the pan, power operated means for actuating said portions to open or close the pan, and cushioning means for controlling the operation of said power operated means.

13. The combination with a weigh pan having portions movable relatively to each other to retain or deliver the contents of the pan, of power operated means for actuating said portions, and cushioning means for controlling the operation of said power operated means.

14. The combination with a weigh pan having portions movable relatively to each other to retain or release the contents of the pan, of power operated means for actuating said portions, said means including a toggle, and means for holding the toggle past its dead center to support said portions in load retaining position.

15. The combination with a weigh pan having portions movable relatively to each other to retain or release the contents of the pan, of power operated means for actuating said portions, and cushioning means for retarding the actuation of the relatively movable portions in the event of failure of the power operating means to function.

In testimony that I claim the foregoing as my own, I have hereto affixed my signature in the presence of two witnesses.

DANIEL F. LEPLEY.

Witnesses:
W. H. SOISSON,
CHAS. L. BAER.